United States Patent [19]
Tada et al.

[11] Patent Number: 5,377,048
[45] Date of Patent: Dec. 27, 1994

[54] LENS BARREL

[75] Inventors: Kanehiro Tada, Tokyo; Eiji Ohshima, Kanagawa, both of Japan

[73] Assignee: Sony Corporation, Japan

[21] Appl. No.: 21,681

[22] Filed: Feb. 24, 1993

[30] Foreign Application Priority Data

Mar. 13, 1992 [JP] Japan .................................. 4-054604

[51] Int. Cl.[5] .......................... G02B 7/02; G02B 15/14
[52] U.S. Cl. ..................................... 359/823; 359/694; 359/696
[58] Field of Search .................. 359/694–706, 359/808–830, 696, 697, 703, 704, 808, 811, 814, 819, 823, 824; 354/195.1, 286, 400

[56] References Cited

U.S. PATENT DOCUMENTS

| | | | |
|---|---|---|---|
| 4,749,268 | 6/1988 | Moskovich et al. | 359/698 |
| 5,016,993 | 5/1991 | Akitake | 359/696 |
| 5,150,260 | 9/1992 | Chigira | 359/823 |

FOREIGN PATENT DOCUMENTS

| | | | |
|---|---|---|---|
| 159110 | 7/1987 | Japan | 359/698 |
| 20813 | 1/1990 | Japan | 359/696 |
| 49112 | 12/1991 | Japan | 359/824 |
| 49202 | 2/1992 | Japan | 359/824 |
| 49203 | 3/1992 | Japan | 359/824 |

*Primary Examiner*—Loha Ben
*Assistant Examiner*—Thong Nguyen
*Attorney, Agent, or Firm*—Ronald P. Kananen

[57] ABSTRACT

A lens barrel is composed of a shaft located in a lens barrel parallel to the optical axis thereof, a movable lens frame installed in the lens barrel having a bearing to receive the shaft and holding a lens therein to be moved therewith along the direction of the optical axis via the bearing and the shaft, and a cantilever made from a elastic material of which one end is fixed to the bearing and another end is pressed to the shaft, the cantilever being extended along the direction of the optical axis. The cantilever may be a flat spring formed of synthetic resin.

20 Claims, 3 Drawing Sheets

LENS BARREL

BACKGROUND OF THE INVENTION

1. Field of The Invention

The present invention relates generally to a lens barrel of an inner-focusing type. Specifically, the present invention relates to such lens barrel commonly installed in a video camera.

2. Description of the Background Art

Generally, an inner-focusing type of lens barrel in which groups of element lenses, such as compensator lenses or master lenses, are axially arranged to be microscopically moved along the optical axis of the lens barrel for focusing images is installed in a common video camera. The lens group is held by a movable lens frame installed in the lens barrel so as to axially move with the lens along the optical axis. FIG. 1 shows an example of such movable lens frame. A movable lens frame 100 having an approximately annular configuration holding a lens group 101, e.g., a variator lens group having a magnification varying mechanism for zooming images, in the inner circumference of the lens frame, moves with the lens 101 to the direction along the optical axis C of the lens barrel. A sleeve bearing 102 having an approximately H-shaped transverse section is integrally projected from the outer circumference of the lens frame 100 toward the upward direction thereof, and concurrently, extended along the optical axis C. The sleeve bearing 102 has a pair of tapped holes 102a and 102b respectively in a front and a back portion thereof. A lead screw axis 103 rotatably driven by a motor, not shown in the figure, screws through both tapped holes 102a and 102b. A flat spring 104 formed of elastic material is fixed on the side surface of the outer circumference of the lens frame 100 at a base member 104a thereof to convert radial rotation of the lead screw axis 103 to axial movement along the optical axis C. The flat spring 104 extends from a base member 104a toward the direction of the lead screw axis 103, and a flexible end 104b is extended from the spring 104 toward the lead screw axis 103 so as to press to gear the side portion thereof. Thus, side pressure P is applied from the flat spring 104 toward the screw axis 103 to control mechanical positioning hysteresis of the screw axis 103 during driving. A guiding slit 100b is formed at the lowest portion of the outside circumference of the lens frame 100 opposite the side from which the sleeve bearing 102 is projected. A guide axis 105 is located to slidably contact with the guiding slit 100b. The movable lens frame 100 is reciprocated by the reversible rotation of the lead screw axis 103 forwardly and backwardly along the axial direction of the optical axis C, concurrently, being guided by the guide axis 105. Thus, the lens 101 held by the lens frame 100 is reciprocated forwardly and backwardly along the axial direction of the optical axis C.

The flat spring 104 presses the lead screw axis 103 of the movable lens frame 100 by the side pressure P generated. In order to accomplish precise positioning of the lens frame 100 on the lead screw axis 103, the spring 104 must be easily deflected toward the direction of a Y-axis, and concurrently, must be hard to deflect toward the directions of an X-axis and a Z-axis, as shown in FIG. 1, i.e., the spring 104 must be formed so as to have a low spring constant with respect to displacement toward the Y-axis direction and a high spring constant with respect to displacement toward the X-axis and Z-axis directions.

However, because the flat spring 104 has a cantilever construction regarding with the Y-axis and Z-axis directions, it is difficult to control the spring coefficient to be low only toward the Y-axis direction. This causes precise positioning of the movable lens frame 100 to be difficult.

SUMMARY OF THE INVENTION

It is therefore a principal object of the present invention to provide a lens barrel which can improve positioning precision of a movable lens frame installed in the lens barrel, wherein the stop position of the lens frame is a nominal position when the lens frame is started to move.

It is another object of the present invention to provide a lens barrel having a flat spring only deflectably toward the Y-axis direction thereof to raise stiffness of the spring with respect to the X-axis and Z-axis directions.

In order to accomplish the aforementioned and other objects, a lens barrel is composed of a shaft located in a lens barrel parallel to the optical axis thereof, a movable lens frame installed in the lens barrel having a bearing to receive the shaft and holding a lens therein to be moved therewith along the direction of the optical axis via the bearing and the shaft, and means for converting radial rotation of the shaft to linear motion of the movable lens frame, installed to the bearing and extended toward the direction of the optical axis.

According to another aspect of the present invention, a lens barrel is composed of a shaft located in a lens barrel parallel to the ideal optical axis thereof, a movable lens frame installed in the lens barrel having a bearing to receive the shaft and holding a lens therein to be moved therewith along the direction of the optical axis via the bearing and the shaft, and a cantilever made by an elastic material of which one end is fixed to the bearing and another end is pressed to the shaft. The elastic material is extended along the direction of the optical axis.

The cantilever elastic material may be a flat spring formed of synthetic resin, or formed of light-weight metal.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 2:
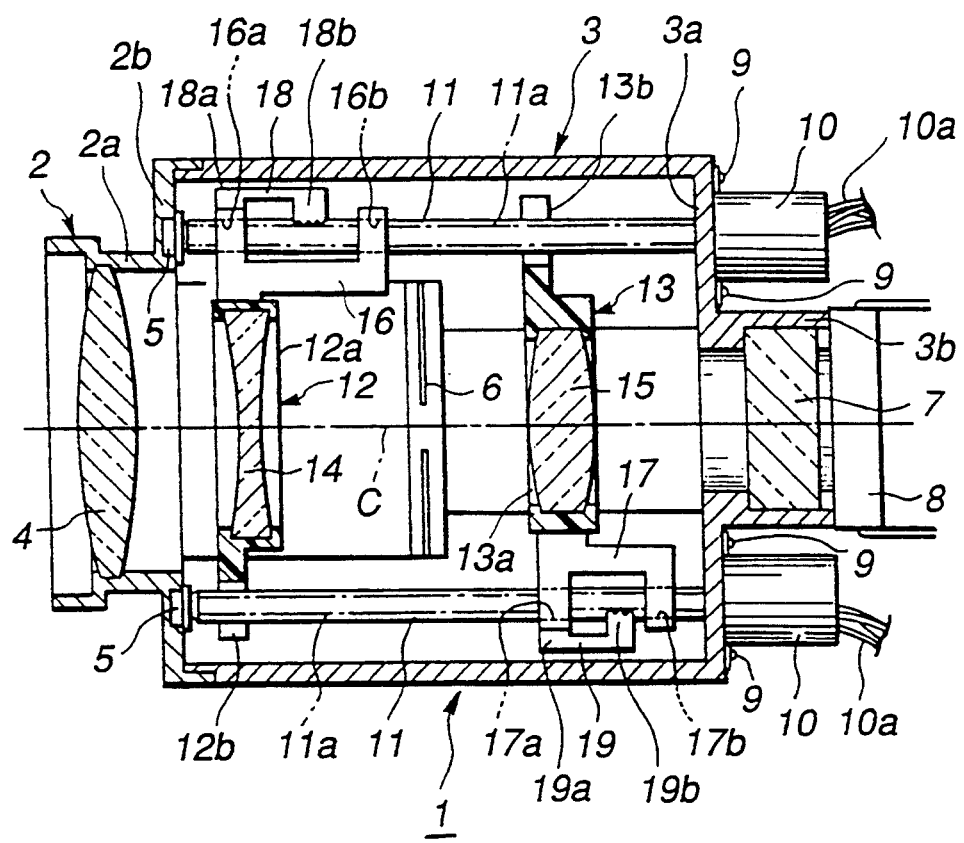
FIG. 2 is a cross sectional view of a lens barrel according to the present invention.
Figure 3:
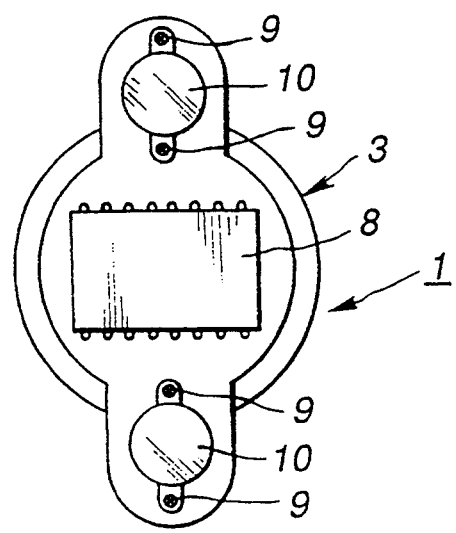
FIG. 3 is a back elevational view of the lens barrel of FIG. 2.

Referring now to the drawings, particularly to FIGS. 2 and 3, a lens barrel 1 of an inner-focusing type includes a front barrel 2 having a cylindrical configuration and a rear barrel 3 having a similar configuration to the front barrel 2 which is engageably connected to a rear flange portion 2b of the front barrel 2. The front barrel 2 and the rear barrel 3 may be formed integrally. A front lens 4 having a positive refractive power is fixed to the inner circumference of the rear barrel 2 by appropriate fixing means, such as thermal calking. A pair of thrust and radial bearings 5, such as pivot bearings, are installed on the upper and lower positions of the rear flange portion 2b of the rear barrel 2. An iris diaphragm 6 is located at the center portion of the rear barrel 3, an optical low-pass filter 7 is located in a cylinder 3b installed at the rear end of the rear barrel 3, and a CCD unit 8, respectively fixed by appropriate fixing means, such as machine screws, not shown in the figure. Upper and lower stepping motors 10 are respectively fixed to the outer surfaces of a flange portion 3a of the rear barrel 3 by machine screws 9. A pair of drive shafts 11 are extended from each stepping motor 10 toward each bearing 5 to be rotatably supported thereby at the end portion of the shaft. The upper and lower stepping motors 10 are connected to a motor driving circuit not shown via lead lines 10a. Each motor 10 is composed of a rotor magnet integrally formed with a rear basement of the drive shaft 11, and a stator fixed to a housing of the motor. The rear basement of each drive shaft 11 is supported by a thrust bearing or a radial bearing, such as a porous bearing metal, not shown in the figure.

The drive shaft 11 of the stepping motor 10 is located parallel to the direction that the optical axis C of the lens barrel 1 is extended. A lead screw 11a is formed around the outer circumference of the drive shaft 11. A first movable lens frame 12 is movably installed at a front portion of the upper lead screw 11a to be moved along the optical axis C. A second movable lens frame 13 is movably installed at a rear portion of the lower lead screw 11a to be moved along the optical axis C.

Figure 4:
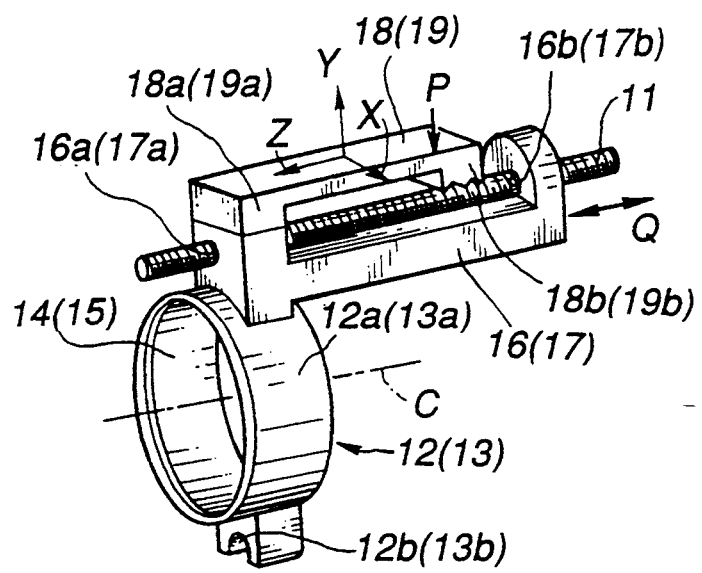
FIG. 4 is a perspective view of a movable lens frame of the lens barrel according to the present invention.

Referring now to FIGS. 2 and 4, The first and second movable lens frames 12 and 13 have approximately annular configurations which are formed of synthetic resin. A variator lens 14 having a negative refractive power with a magnification varying mechanism is held by the first movable lens frame 12, and a master lens 15 having a focusing, compensating and imaging mechanism is held by the second movable lens frame 13. A first sleeve bearing 16 having an approximately H-shaped transverse section is integrally projected from the outer circumference of an annular frame 12a of the first movable lens frame 12. On the other hand, a second sleeve bearing 17 having a similar configuration to the first sleeve bearing 16 is integrally projected from the outer circumference of the annular frame 12a opposite the side from which the first sleeve bearing 16 is projected. The first sleeve bearing 16 has front and rear tapped holes 16a and 16b at the central portion of the front and the rear of the first sleeve bearing 16 so that the lead screw 11a of the drive shaft 11 extended from the stepping motor 10 screws therethrough. Similarly, the second sleeve bearing 17 has front and rear tapped holes 17a and 17b at the central portion of the front and the rear thereof so that another lead screw 11a of another drive shaft 11 extended from another stepping motor 10 screws therethrough. Tapped holes 16a and 16b are respectively screwed by the front portion of the lead screw 11a, and tapped holes 17a and 17b are respectively screwed by the rear portion of another lead screw 11a. First and second flat springs 18 and 19 having a cantilever construction respectively including base members 18a and 19a and flexible members 18b and 19b at the both ends are formed of elastic synthetic resin. A first flat spring 18 is fixed to the top surface of the sleeve bearing 16 at the base members 18a by an adhesive so as to face with the inner circumference of the rear barrel 3 to apply the side pressure P to the drive shaft 11 of the upper stepping motor 10. A second flat spring 19 is fixed to the outer bottom surface of the sleeve bearing 17 at the base members 19a by an adhesive so as to face with the inner circumference of the rear barrel 3 to apply the side pressure P to the drive shaft 11 of the lower stepping motor 10. Both flat springs 18 and 19 extend along the direction of the optical axis C. The flexible members 18b and 19b of both flat springs 18 and 19 are geared with the each lead screw 11a at gear teeth formed thereon being enforced by the side pressure P. Thereby each pair of tapped holes 16a and 16b and 17a and 17b of the respective sleeve bearings 16 and 17 are pressed to gear with both drive shafts 11. Thus, rotation of the drive shafts 11 is converted to linear motion of the first and second movable lens frames 12 and 13 to be moved along the direction of the optical axis C. The first and second movable lens frames 12 and 13 are respectively reciprocated in the predetermined distance without inclining against the optical axis C, while concurrently, the center of lenses 14 and 15 are not shifted from the center of the optical axis C, because motion of the lens frames 12 and 13 are controlled by the flat springs 18 and 19 of the sleeve bearings 16 and 17.

A guide slit 12b having an approximately U-shaped front view is installed at the lower portion of the first movable lens frame 12 opposite the side from which the sleeve bearing 16 is projected. Similarly, a guide slit 13b having a similar configuration to the guide slit 12b is installed at the upper portion of the second movable lens frame 13 opposite the side from which the sleeve bearing 17 is projected. Both guide slits 12b and 13b receive the outer circumference of the corresponding lead screw 11a of the drive shaft 11 at both sides. The guide slit 12b slidably engages the circumference of the lead screw 11a of the lower drive shaft 11 to control the rotating movement of the first movable lens frame 12, while concurrently, the guide slit 13b slidably engages the circumference of the lead screw 11a of the upper drive shaft 11 to control the rotating movement of the second movable lens frame 13.

According to lens barrel 1 as the aforementioned, the first and second movable lens frames 12 and 13 respectively holding the variator lens 14 for zooming and the master lens 15 for focusing are directly driven by rotation of each driven shaft 11 of the upper and lower stepping motors 10. The driven shaft 11 operates not only as the motor shaft and the driving transferring shaft but also as the sliding shaft and the rotation preventing shaft. Therefore, parts to be installed in the lens barrel can be minimized allowing the manufacturing cost to be reduced and the installation volume to be minimized. Additionally, light-weighting, size minimizing and thinning of the lens barrel 1 can be accomplished because the movable lens frames 12 and 13 and the flat springs 18 and 19 are formed of synthetic resin.

Furthermore, the first movable lens frame 12 having the variator lens 14 in the inner circumference thereof is moved along the optical axis C via the lead screw 11a of the upper driven shaft 11 of the upper stepping motor 10, while concurrently, the second movable lens frame 13 having the master lens 15 in the inner circumference thereof is also moved along the optical axis C via the lead screw 11a of the lower driven shaft 11 of the lower stepping motor 10. Because the side pressure P generated by the elastic force of the flat springs 18 and 19 is applied to the driven shafts 11, both driven shafts 11 are pressed to gear with both pair of tapped holes 16a and 16b, and 17a and 17b of the sleeve bearings 16 and 17 respectively and oppositely projected from the movable lens frames 12 and 13. Therefore, during movement of the movable lens frames 12 and 13 along each driven shaft 11, undesirable movement generatable between the driven shaft 11 and the tapped holes 16a, 16b, 17a or 17b toward the Y-axis direction, i.e., the vertical direction, and the X-axis direction, i.e., the transverse direction, can be surely prevented. Therefore, both movable lens frames 12 and 13 can be smoothly moved.

Figure 1:
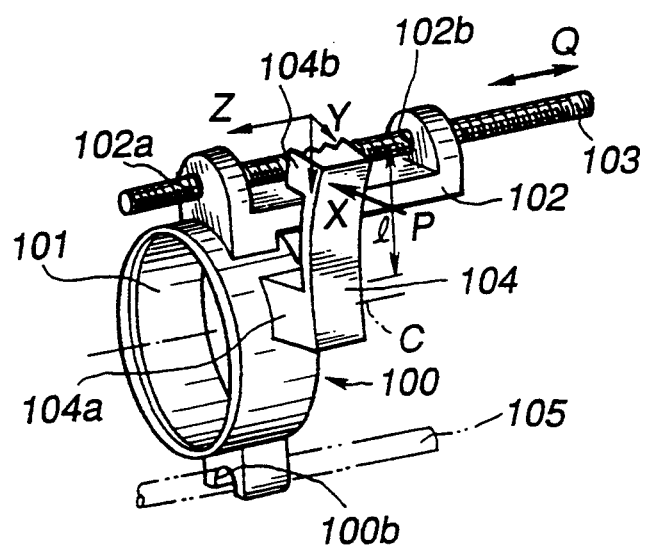
FIG. 1 is a perspective view of a movable lens frame installed in a lens barrel according to prior art.

Thus, the direction of elastic force applied to the driven shaft 11 as the side pressure P of the flat spring 18 or 19 is altered from the X-axis direction of the conventional, as shown in FIG. 1, to the Z-axis direction along the optical axis C, as shown in FIG. 4. Therefore, comparing with a conventional flat spring 104 of FIG. 1, the flat spring 18 or 19 of the present invention is difficult to deflect in the Z-axis direction which influences positioning precision of the movable lens frame. Accordingly, the precision of a stop position of the movable lens frame can be improved.

The displacement degree of the flat spring by the side pressure P and the axial force Q toward each direction, i.e., X, Y and Z-axis directions of FIG. 1, according to the prior art are given by formulas (1) to (3):

$$\delta_X = \mu\, Pl/EbH \qquad (1)$$
$$\delta_Y = 4Pl^3/Ebh^3 \qquad (2)$$
$$\delta_Z = \frac{4l^3}{Ehb^3} \times \frac{\mu P}{\tan\left(\alpha + \tan^{-1}\frac{\mu}{\cos\theta/2}\right)} \qquad (3)$$

and the displacement degree of the flat spring by the side pressure P and the axial force Q toward each direction, i.e., X, Y and Z-axis directions of FIG. 4, according to the present invention are given by formulas (4) to (6):

$$\delta_X = 4\mu\, Pl^3/Ehb^3 \qquad (4)$$
$$\delta_Y = 4Pl^3/Ebh^3 \qquad (5)$$
$$\delta_Z = \frac{l}{Ebh} \times \frac{\mu P}{\tan\left(\alpha + \tan^{-1}\frac{\mu}{\cos\theta/2}\right)} \qquad (6)$$

where, E: modulus of direct elasticity (Young's modulus), b: width of the flat spring, h: thickness of the flat spring, A (=bh): cross-sectional area of the flat spring, 1: length of the flat spring, $\theta$: flank angle of the lead screw, $\mu$: friction coefficient between the flat spring and the lead screw, $\alpha = \tan^{-1}(\theta/\pi d)$: lead angle, $\theta$: lead pitch, and d: axis diameter of the lead screw.

The spring constant of the flat spring 104 is equal to that of the flat spring 18 or 19, i.e., both springs have an equal effect, because of $\delta y = \delta y'$. Therefore, the spring constants with respect to the X-axis and Z-axis directions are given by the following formulas (7) and (8).

$$kx/kx' = (4l^2)/b^2 \qquad (7)$$
$$kz/kz' = b^2/(4l^2) \qquad (8)$$

When appropriate values, e.g., $1=10$ mm, $b=2.5$ mm, are substituted in formulas (7) and (8), $$kx/kx' = 64, \text{ and } kz/kz' = 1/64$$

are obtained. Therefore, regarding to the Z-axis direction which influences the precision of the stop position of the movable lens frames 12 and 13, the flat spring 18 or 19 according to the present invention is about 64 times as difficult to deflect compared to that of the prior art. On the other hand, regarding X-axis direction which does not influence precision of the positioning of the lens frame, the flat spring 18 or 19 of the present invention is 64 times as easy to deflect that of the prior art contrary to the result obtained relating to the Z-axis direction. However, sliding degree of the flat spring to the Z-axis direction, i.e., to the direction of the optical axis, is reduced by sliding flat spring to the X-axis direction as follows.

Figure 5:
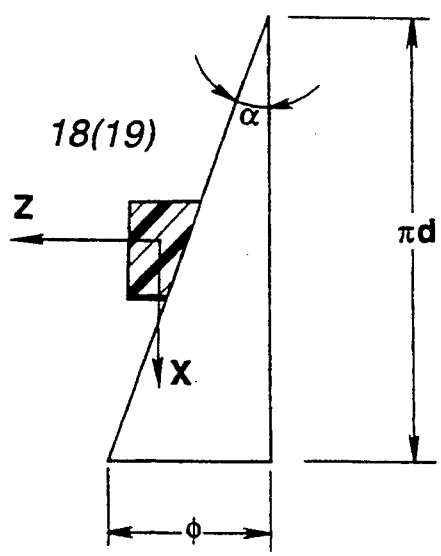
FIG. 5 is a two-dimensional development of one lead pitch of a lead screw which moves the movable lens frame according to the present invention.

Referring to FIG. 5 showing a two-dimensional development of one lead pitch of the lead screw 11a of the driven shaft 11, the flat spring displaced in the X-axis direction is moved along lead angle $\alpha$; therefore, the flat spring is also displaced in the Z-axis direction. The displacement degree of the flat spring with respect to the Z-axis direction $\delta zx$ of prior art and $\delta zx'$ of the present invention are given by formulas (9) and (10).

$$\delta zx = \delta x \tan\alpha \qquad (9)$$
$$\delta zx' = \delta x' \tan\alpha \qquad (10)$$

When the values of a lead angle $\alpha$ in a generally known range of 3° to 5° are substituted in formulas (9) and (10), the values of $\tan\alpha$ about in a range of 1/11 to 1/20 are obtained. Therefore, the displacement degree of the flat spring according in the present invention to the Z-axis direction caused by that in the X-axis direction is 160 times that of the prior art; however, that becomes negligibly small comparing with displacement degree of that in the Z-axis direction caused by that in the Z-axis direction.

When appropriate values, e.g., $1=10$ mm, $b=2.5$ mm, $P=0.03$ kgf, $\mu=0.2$, $E=150$ kgf/mm$^2$, $h=0.4$, $\phi=0.5$ mm are respectively substituted in the aforementioned formulas (3), (6), (9) and (10), the following results of $$\delta z = 81\ \mu m,\ \delta z' = 1.3\ \mu m,$$

$$\delta zx = 3.2 \times 10^{-2}\mu m,\ \delta zx' = 2\ \mu m$$

are obtained.

The depth of focus is generally obtained by the equation:

Depth of focus = F × circle of least confusion

When $F=1.6$ to 1.8, and a circle of least confusion $=15\mu m$ are substituted in the aforementioned equation, a value for depth of focus=20 to 27 is obtained.

If the precision of the stop position of the movable lens frame 12 or 13 relating to the direction of the optical axis is assumed to be in the range of this depth of focus, δz of prior art influences to the positioning precision, while influence of δz' according to the present invention becomes negligibly small compared with the depth of focus relating to both of the X-axis and Z-axis directions.

Therefore, the flat spring 18 or 19 of the present invention becomes deflectable only toward the Y-axis direction. Concurrently, stiffness of the flat spring to the X-axis and Z-axis directions can be raised. Thus, precision of the stop position necessary for the movable lens frame 12 or 13 can be improved. Additionally, the lens barrel can be light-weight because the flat springs are formed of synthetic resin.

While the present invention has been disclosed in terms of the preferred embodiment in order to facilitate better understanding of the invention, it should be appreciated that the invention can be embodied in various ways without depending from the principle of the invention. Therefore, the invention should be understood to include all possible embodiments and modification to the shown embodiments which can be embodied without departing from the principle of the inventions as set forth in the appended claims. For example, the lens barrel of the present invention may be utilized not only for a video camera but also for a still camera. The flat spring may be formed of light-weight metal.

What is claimed is:

1. A lens barrel comprising:
   a shaft located in a lens barrel parallel to an optical axis thereof,
   a movable lens frame installed in said lens barrel having a bearing to receive said shaft and holding a lens therein to be moved therewith along the optical axis via said bearing and said shaft, and
   means, including a flat spring having a cantilever construction respectively including a base member and a flexible member at both ends and formed of an elastic material, for converting a radial rotation of said shaft to a linear motion of said movable lens frame wherein said means is fixed to said bearing and is extended in a direction parallel to the optical axis.

2. A lens barrel as set forth in claim 1 wherein said bearing is a sleeve bearing wherein said flat spring is fixed to a top surface of said sleeve bearing.

3. A lens barrel as set forth in claim 1 wherein said flat spring extends along the direction of an optical axis of the lens barrel.

4. A lens barrel as set forth in claim 1 wherein said flexible member cooperates with said shaft so that a rotation of the shaft is converted to a linear motion of said movable lens frame.

5. A lens barrel as set forth in claim 1 wherein said lens barrel includes a second shaft located parallel to said shaft and parallel to the optical axis, a second movable lens frame having a second bearing to receive said second shaft and holding a lens therein to be moved therewith along the optical axis via said second bearing and said second shaft; and
   second means, including a second flat spring having a cantilever construction respectively including a base second member and a second flexible member at both ends and formed of an elastic material, for converting a radial rotation of said second shaft to a linear motion of said second movable lens frame wherein said second means is fixed to said second bearing and is extended in a direction parallel to the optical axis.

6. A lens barrel as set forth in claim 5, wherein said second flat spring is fixed to an outer bottom surface or said second bearing.

7. A lens barrel comprising:
   a shaft located in a lens barrel parallel to an optical axis thereof,
   a movable lens frame installed in said lens barrel having a bearing to receive said shaft and holding a lens therein to be moved therewith along the optical axis via said bearing and said shaft, and
   a cantilever made by an elastic material of which one end is fixed to said bearing and another end is pressed to said shaft, said cantilever being extended in a direction parallel to the optical axis.

8. A lens barrel as set forth in claim 7, wherein said cantilever is a flat spring formed of synthetic resin.

9. A lens barrel as set forth in claim 7, wherein said cantilever is a flat spring formed of light-weight metal.

10. A lens barrel as set forth in claim 7, wherein said bearing is a sleeve bearing wherein said cantilever is fixed to a top surface of said sleeve bearing.

11. A lens barrel as set forth in claim 7 wherein said cantilever acts as a flat spring and extends along the direction of an optical axis of the lens barrel.

12. A lens barrel as set forth in claim 7, wherein said cantilever cooperates with said shaft so that a rotation of the shaft is converted to a linear motion of said movable lens frame.

13. A lens barrel as set forth in claim 7 wherein said lens barrel includes a second shaft located parallel to said shaft and parallel to the optical axis thereof, a second movable lens frame having a second bearing to receive said second shaft and holding a lens therein to be moved therewith along the optical axis via said second bearing and said second shaft; and
   a second cantilever made by an elastic material of which one end is fixed to said second bearing and another end is pressed to said second shaft, said cantilever being extended in a direction parallel to the optical axis.

14. A lens barrel as set forth in claim 13, wherein said bearing is a sleeve bearing wherein said cantilever is fixed to a top surface of said sleeve bearing.

15. A lens barrel comprising:
   a shaft located in a lens barrel parallel to an optical axis thereof;
   a movable lens frame installed in said lens barrel having a bearing to receive said shaft and holding a lens therein to be moved therewith along the optical axis via said bearing and said shaft; and
   a spring means cantilevered from said bearing for converting a rotation of said shaft to a linear motion of said movable lens frame, wherein said spring means extends from said bearing in a direction parallel to said optical axis.

16. The lens barrel as set forth in claim 15, wherein said spring means is a flat flexible member formed of an elastic material.

17. The lens barrel as set forth in claim 15, wherein said shaft comprises a threaded portion, and said spring means comprises a threaded portion biased into engagement with the threaded portion of the shaft.

18. The lens barrel as set forth in claim 17, wherein said bearing comprises first and second tapped holes for slidably receiving said shaft, said first and second tapped holes being axially spaced from each other along a length of the shaft.

19. The lens barrel as set forth in claim 18, wherein said spring means is cantilevered from said bearing adjacent said first tapped hole, and said threaded portion of the spring means is biased into engagement with said shaft at a position between said first and second tapped holes of the bearing.

20. The lens barrel as set forth in claim 15, wherein said spring means has its highest rigidity in a direction parallel to said optical axis.

* * * * *